United States Patent

[11] 3,614,451

| [72] | Inventor | John B. Gunn<br>Mt. Kisco, N.Y. |
|---|---|---|
| [21] | Appl. No. | 753,523 |
| [22] | Filed | Aug. 19, 1968 |
| [45] | Patented | Oct. 19, 1971 |
| [73] | Assignee | International Business Machines Corporation<br>Armonk, N.Y. |

[54] SAMPLING SYSTEM UTILIZING ELECTROOPTIC TECHNIQUES
15 Claims, 1 Drawing Fig.

[52] U.S. Cl. .................................... 250/217,
250/225, 324/96, 332/3, 350/160 R
[51] Int. Cl. .................................... G02f 1/28,
G02f 1/18
[50] Field of Search .................................... 250/217,
225; 324/96; 340/190; 350/160; 334/15; 332/3

[56] References Cited
UNITED STATES PATENTS

| 3,069,559 | 12/1962 | Chaplin et al. | 307/220 |
|---|---|---|---|
| 3,365,581 | 1/1968 | Tell et al. | 350/160 UX |
| 3,369,122 | 2/1968 | Buhrer | 350/159 X |
| 3,466,541 | 9/1969 | Bernard et al. | 324/96 |

*Primary Examiner*—James W. Lawrence
*Assistant Examiner*—C. M. Leedom
*Attorneys*—Hanifin and Jancin and John E. Dougherty, Jr.

ABSTRACT: A sampling system is described which utilizes electrooptic techniques for sampling an electrical signal. Short duration light pulses are polarized and directed through a crystal exhibiting either a linear or longitudinal electrooptic effect or through a liquid showing a large Kerr effect, located in traveling wave relationship with a terminated transmission line structure. The group velocity of the polarized light, that is, the velocity of a light pulse, or the velocity of the modulation envelope of a modulated light beam, along the electrooptic crystal and the phase velocity of the electrical signal along the transmission line structure are in synchronism. Due to electrically induced birefringence, the state of polarization of the light pulse is altered according to the electrical field intensity to which the electrooptic crystal is subjected by that portion of the electrical signal traveling coincidentally along the transmission line structure. Consequently, the transmission of the light pulse by a crossed analyzer placed at the output of the electrooptic crystal varies in response to the coincidental portion of the electrical signal. The energy of the light pulse emanating from the analyzer is detected and directed to a utilization of circuit, for example, the hold and display circuitry of a sampling oscilloscope.

PATENTED OCT 19 1971
3,614,451
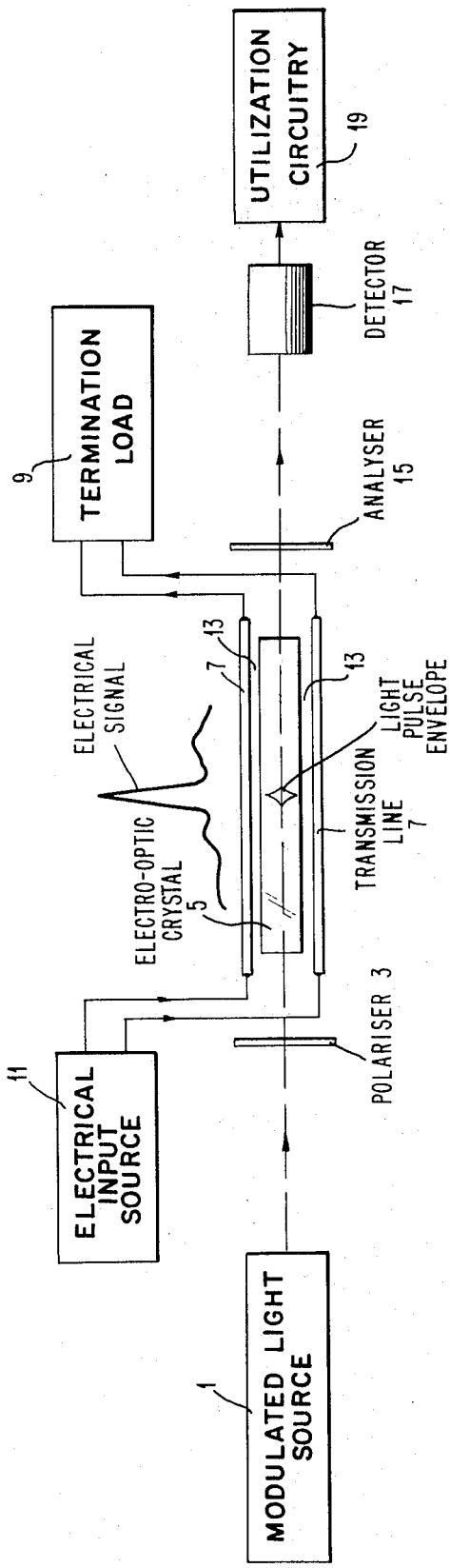
INVENTOR
JOHN B. GUNN
BY S. P. Tedesco
ATTORNEY

SAMPLING SYSTEM UTILIZING ELECTRO-OPTIC TECHNIQUES

BACKGROUND OF THE INVENTION

In many areas of the prior art, it is desirable to sample discrete portions of an electrical signal and to utilize such sampled information for various purposes, for example, in time-division-multiplex-communication systems to achieve simultaneous transmission of a plurality of signals, e.g., voice signals, along a single communication link, or in sampling oscilloscopes to allow a CRT display of electrical signals that otherwise defy observation. In a sampling oscilloscope, to effect the sampling function, the instantaneous amplitude of an electrical signal, generally of a repetitive nature, is "looked at," or sampled, for a specific small time interval, each successive sampling being made at a slightly later time in relationship to a fixed point of each signal cycle. The system remembers the sampled information and, after many successive samplings, reconstructs the electrical signal.

The time resolution of a sampling system, generally, is determined by the time duration of the sampling of the electrical signal. In the prior art, the sampling of electrical signals has been effected by specialized electronic circuitry; however, inherent limitations of such circuitry necessarily limit the sampling time. For many applications, it would be desirable to reduce the sampling time below that which is presently obtainable by such electronic circuitry, for example, to increase the resolution of a sampling oscilloscope, to increase the message density of a time-division-multiplex system, etc.

At the present time, the technology has achieved sampling times which are relatively very small, e.g., in the order of 30 psec. However, the sampling time is limited by the speed of the electronic circuitry, particularly by the length of the electrical pulse which is conventionally used to open a diode-bridge sampling gate. If the use of electronic techniques to effect the sampling function along with the limitations inherent therein can be avoided the sampling time and, hence, the resolution of sampling systems can be improved.

Accordingly, it is an object of this invention to provide a sampling system wherein the sampling time is minimized so as to increase system resolution.

It is another object of this invention to provide a sampling system which utilizes electro-optic techniques.

The foregoing and other objects, features, and advantages of the invention will be apparent from the following more particular description of the preferred embodiment of the invention, as illustrated in the accompanying drawings.

BRIEF DESCRIPTION OF THE DRAWINGS

FIG. 1 is a schematic representation of a sampling system utilizing electro-optic techniques to achieve the sampling function in accordance with the present invention.

SUMMARY OF THE INVENTION

It is known that certain electro-optic effects accompany the passage of a light beam through particular crystalline materials or liquids when subjected to electrical fields. For example, wide-band light modulation has been achieved by traveling wave interaction as reported in "Wide-Band Microwave Light Modulation," by W. W. Rigrod, et al., *Proceedings of the IEEE*, 1963, pages 137-140. In the described light modulator, a light beam was directed through an electro-optic crystal disposed in traveling wave relationship with a modulating signal of microwave frequency directed along a transmission line structure. The phase velocity of the modulating signal along the transmission line structure and the component of the velocity of light along the electro-optic crystal in the same direction were in synchronism, the refractive indices of the electro-optic crystal being varied by electric fields due to the electrical signal along the transmission line structure to alter the state of polarization of the light and, also, to modulate the fraction of the light energy passing through an analyzer placed at the output end of the electro-optic crystal. Also, a similar structure has been described in "Gigacycle Band-Width Coherent Light Traveling-Waves Phase Modulation," by C. J. Peters, *Proceedings of the IEEE*, 1963, pages 147-153. Phase modulation of light can be converted to amplitude modulation by means of interference or beating techniques.

In the prior art utilization of electro-optic effects, therefore, effort has been particularly directed toward the modulation of a continuous light beam by an electrical signal directed along a transmission line structure. Also, a traveling-wave optical transducer has been described in the article, "Traveling-Wave Optical Transducer," by J. B. Gunn, *IBM Technical Disclosure, Bulletin*, Vol. 10, No. 4, Sept., 1967, wherein a quadratic electro-optic effect has been used to induce an electrical signal along a transmission line structure from an optical signal. The linear electro-optic effect, however, can be advantageously utilized to achieve a sampling or mixing function in a more efficient manner heretofore achieved by electronic techniques and avoid certain prior art limitations so as to achieve much smaller sampling times, e.g. in the order of 1 psec., in sampling systems, or higher operating frequencies in mixing systems. By reducing the sampling time, the resolution of a sampling system can be substantially increased.

In the present invention, a modulated light beam, e.g., a series of light pulses of short duration, for example, generated by a mode-locked laser, a sinusoidally modulated light beam, etc., is polarized and directed through an electro-optic crystal, e.g., potassium dihydrogen phosphate (KDP) potassium dideuterium phosphate (KD$_d$P), ammonium dihydrogen phosphate (ADP), lithium niobate (LiNbO$_3$), barium sodium niobate (Ba$_2$NaNb$_5$O$_{15}$), gallium arsenide (GaAs), etc., or through a liquid having a large Kerr effect, e.g., nitrobenzene, which is located in a matched transmission line system to achieve traveling wave interaction between the electrical and optical signals. By proper design, the phase velocity of the electrical signal and the component of the group velocity of the polarized light beam in the direction of propagation of the electrical signal are synchronized to achieve maximum coupling. The state of polarization of the modulated light beam is altered due to electrically induced birefringence which is a function of the electrical field intensity to which the electro-optic crystal is subjected by that portion of the electrical signal traveling coincidentally along the transmission line structure. The degree of alteration of the light beam is indicative of the amplitude of the electrical signal traveling coincidentally along the transmission line structure. For example, the time interval between successive pulses can be related to a fixed point on each signal cycle, successive samplings of the instantaneous amplitude of the electrical signal being detected and fed to the hold and display circuitry of a sampling oscilloscope.

DESCRIPTION OF THE INVENTION

Referring to FIG. 1, a modulated light source 1, e.g., a mode-locked laser, for example, as described in the J. A. Armstrong, et al. patent application, Ser. No. 646,367, filed on June 15, 1967, and assigned to a common assignee, is shown which directs a train of ultrashort light pulses through a polarizer 3 and along the optical axis of electro-optical crystal 5, e.g. of potassium dihydrogen phosphate (KDP) potassium dideuterium phosphate (KD$_d$P), etc. The mode-locked laser serves to illustrate one source of ultrashort light pulses which may be utilized in the practice of this invention; alternatively, a laser beam can be modulated so as to provide a series of light pulses to the crystal 5, the time interval between successive light pulses being controlled so as to effect the sampling function.

The crystal 5 is positioned within a transmission line structure 7, which is properly terminated by load 9, such that in this particular case the direction of propagation of the light pulse and electrical signals along structure 7 are colinear. In general, the component of the group velocity of the optical signal in the direction of propagation of the electrical signal and the phase velocity of the electrical signal along crystal 5 and transmission line 7, respectively, are in synchronism. Preferably, crystal 5 is located centrally within transmission line structure 7 so as to maximize coupling therebetween. The state of polarization of each successive light pulse traveling along crystal 5 is altered to a degree determined by the electric field intensity to which crystal 5 is subjected by that portion of the electrical signal traveling coincidentally along the transmission line structure 7 due to electrically induced birefringence.

As shown, transmission line structure 7 is connected to a source of repetitive electrical signals 11 to be sampled. Accordingly, various portions of crystal 5 are subjected to electric fields having an intensity corresponding to the coincident amplitude of the electrical signal along transmission line structure 7. The state of polarization of the light pulse traveling through crystal 5 is altered in each portion of the crystal determined by the intensity of electric fields to which crystal 5 is subjected while the light pulse is present in that portion. If the group velocity of the light pulse, and the phase velocity of the electrical signal are substantially equal, the alteration is determined by substantially the same portion of the electrical signal traveling coincidentally along transmission line structure 7. The degree of alteration of the polarized light pulse from its original state as determined by polarizer 3 indicates the coincident amplitude of the electrical signal along the transmission line structure 7. The length of crystal 5 is not critical and should be a compromise between the degree of alteration of the polarized light pulse per unit amplitude of the electrical signal, and the maximum allowable distortion of the light pulse due to dispersion effects in the crystal.

To achieve optimum time resolution of the signal on the transmission line structure 7 the phase velocity of the electrical signal and the component of the group velocity of the polarized light pulse in the direction of propagation of the electrical signal along crystal 5 should be in synchronism. For example, relative synchronism can be achieved by choosing an electro-optic crystal 5 having a suitable combination of refractive index and dielectric constant, or the electrical phase velocity along the transmission line structure 7 can be adjusted either by filling the space 13 between the crystal and the conductors of structure 7 with a dielectrical material of different dielectric constant, or by adjusting the spacing 13 between the conductors and crystal, or the paths of the light beam and electrical signal may be inclined. The birefringence which causes the alteration of the state of polarization of the beam of light is due to the effect of the imposed electrical field in the electro-optic crystal 5. Such birefringence results in a difference of phase velocity for waves polarized in different planes, whereby the state of polarization as a light beam, initially polarized at an angle of the optical axes, is altered.

To complete the sampling process, the light pulse emanating from crystal 5 is directed to an analyzer 15 and a detector 17, e.g., preferably a photocell which may have a relatively slow response, to measure the total alteration of the original state of polarization. Analyzer 15 may be set at right angles to the plane determined by the polarizer 3. Accordingly, the total light energy passing through analyzer 15 corresponds to the instantaneous amplitude of the electrical signal which coincided spacially with the light pulse during passage along crystal 5. The output of detector 17 is directed to a utilization circuit 19, for example, holding circuitry of a sampling oscilloscope, which may be conventional. Since the time interval between successive light pulses along crystal 5 are controlled to increase slightly, the output of detector 17, therefore, corresponds to periodically sampled portions of the electrical signal directed along the transmission line.

While the invention has been particularly shown and described with reference to the preferred embodiment thereof, it will be understood by those skilled in the art that the foregoing and other changes in form and details may be made therein without departing from the spirit and scope of the invention.

What is claimed is:

1. In combination,
a transparent medium having controllable optical properties,
means for directing a pulse of light through said medium, the spatial extent of said pulse being substantially less than the optical path length through said medium,
means for varying the optical properties of discrete portions of said medium synchronously with the propagation of said pulse of light traveling through said discrete portions to indicate particular information, and
means responsive to said pulse of light for ascertaining said particular information.

2. In combination,
a transparent medium exhibiting electro-optic properties,
means for directing successive pulses of polarized light through said medium, the spatial extent of said pulses being substantially less than the optical path length through said medium,
means for subjecting that portion of said medium along which a light pulse is traveling to electric fields of particular intensity indicative of particular information, the state of polarization of said light pulse as it travels along said medium being altered as a function of said electric field intensity, and
means responsive to said pulse emanating from said medium for ascertaining said particular information.

3. The combination as defined in claim 2 wherein said medium is a crystalline body formed of a material selected from the group consisting of potassium dihydrogen phosphate (KDP), potassium dideuterium phosphate ($KD_dP$), ammonium dihydrogen phosphate (ADP), lithium niobate ($LiNbO_3$), barium sodium niobate ($Ba_2NaNb_5O_{15}$), and gallium arsenide (GaAs).

4. The combination as defined in claim 2 wherein said medium is a liquid exhibiting a large Kerr effect.

5. The combination as defined in claim 2 wherein said subjecting means includes means for applying electrical fields having an intensity distribution and traveling substantially colinearly with said light pulses through said medium, the phase velocity of said distribution and the group velocity of said light pulses being substantially equal.

6. The combination as defined in claim 5 wherein said electric field distribution is repetitive and said directing means is operative to vary the time relationship between said successive pulses and said repetitive electric field distribution.

7. The combination as defined in claim 6 wherein said directing means is operative to direct at least one pulse through said medium during each repetition of said electric field distribution.

8. In combination,
a transparent medium exhibiting electro-optic properties,
means for directing a pulse of polarized light through said medium, the spatial extent of said light pulse being less than the optical path length of said pulse through said medium,
means for varying said properties of said medium synchronously with the passage of said light pulse to vary the characteristics of said pulse,
and means responsive to said light pulse emanating from said medium.

9. The combination of claim 8 wherein said medium comprises a crystalline material.

10. The combination of claim 8 wherein said varying means is operative to alter the state of polarization of said pulse traveling through said medium.

11. The combination of claim 8 wherein said medium comprises a liquid exhibiting a large Kerr effect.

12. In combination,
a transparent medium exhibiting electro-optic properties and a transmission line structure coupled in traveling wave fashion, the phase velocity of an electrical signal along said structure and the group velocity of light through said medium being substantially identical, first means for directing a pulse of polarized light along said medium, the spatial extent of said pulse being substantially less than the optical path length through said medium, second means for directing a varying electrical signal along said structure, a coincident portion of said electrical signal being effective to vary the transmission characteristics of that portion of said medium in which said pulse is traveling to change the character of said light pulse in accordance with said coincident portion of said electrical signal, and means responsive to said pulse emanating from said medium to ascertain information regarding that portion of said electrical signal which traveled along said structure coincidentally with said pulse.

13. The combination as defined in claim 12 wherein said second means includes means for directing a repetitively varying electrical signal concurrently along said structure, said first means being operative to direct successive pulses of polarized light through said medium and for controlling the time relationship of said pulses and said electrical signal so that successive ones of said pulses and electric signals have a different time relationship with respect to each other.

14. The combination as defined in claim 12 wherein said responsive means includes means for storing said information.

15. The combination as defined in claim 12 wherein said responsive means includes hold and display circuitry of a sampling oscilloscope.